May 12, 1953   L. E. BROWN   2,638,116
VALVE ASSEMBLY
Filed July 7, 1947   2 Sheets-Sheet 1

Inventor
Luther E. Brown
By
E. V. Hardway
Attorney

May 12, 1953          L. E. BROWN          2,638,116
VALVE ASSEMBLY
Filed July 7, 1947          2 Sheets-Sheet 2
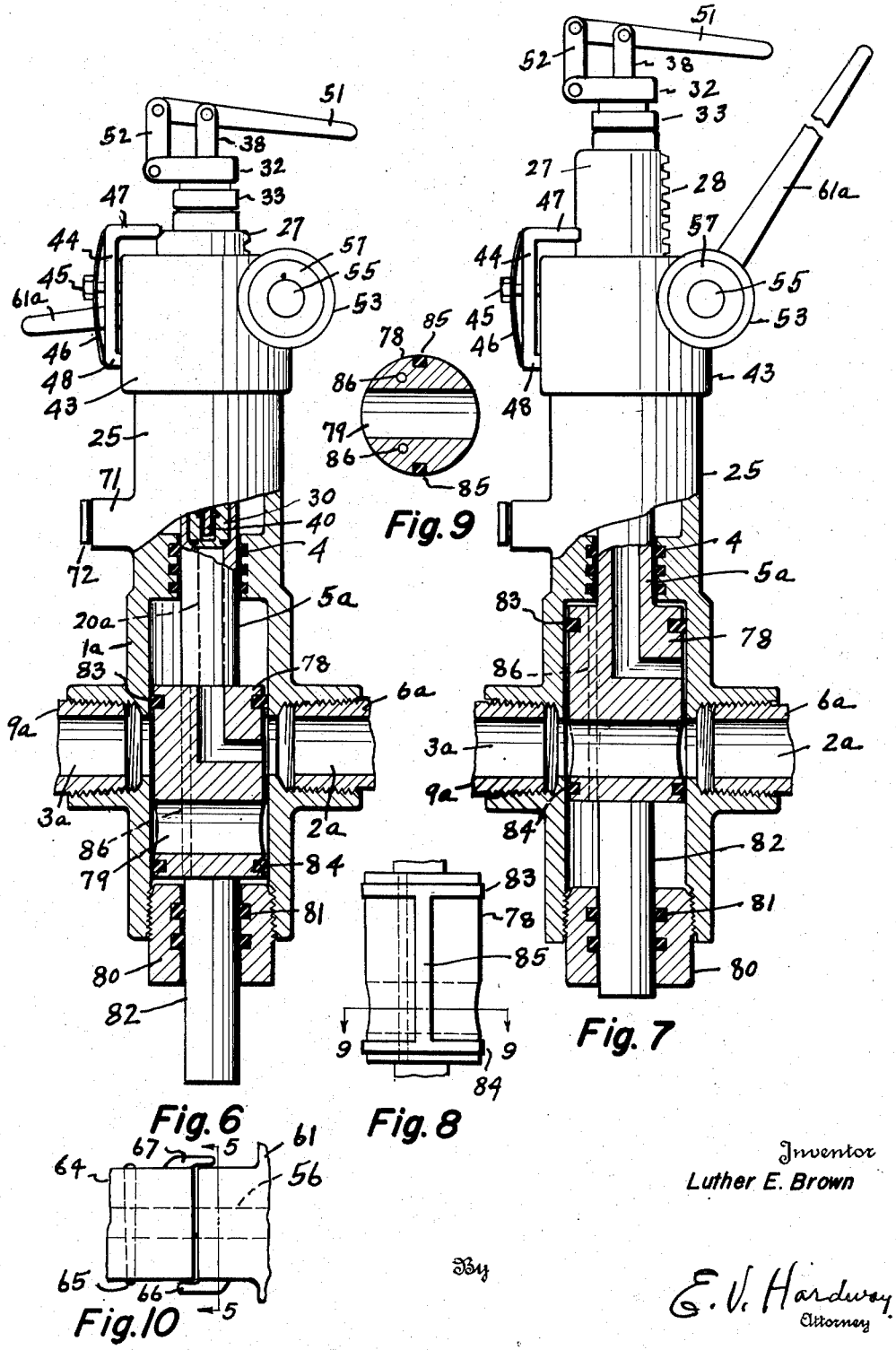
Inventor
Luther E. Brown
By E. V. Hardway
Attorney Patented May 12, 1953

2,638,116

UNITED STATES PATENT OFFICE 2,638,116

VALVE ASSEMBLY

Luther E. Brown, Greggton, Tex.

Application July 7, 1947, Serial No. 759,339

9 Claims. (Cl. 137—490)

This invention relates to a valve assembly and has particular relation to a relief valve assembly.

The invention embodies certain improvements over that type of relief valve disclosed in United States Patent No. 1,973,744 issued to this applicant on September 18, 1934. The improvements herein described are applicable to various types of valves, such as gate valves, angle valves, plug valves and the like.

It is another object of the invention to provide an assembly of the character described which will be automatically opened, by the pressure, should the pressure increase beyond a predetermined limit; however, means have been provided also for manually opening the valve.

It is still a further object of the present invention to provide a valve assembly of the character described which may be cheaply and easily constructed and whose parts, subject to wear, may be readily replaced.

Other objects and advantages will be apparent from the following specification which is illustrated by the accompanying drawings, wherein:

Figure 6 is a side elevation, partly in section, showing another embodiment of the invention with the valve closed.

Figure 7 is a side elevation, partly in section, and showing the valve open.

Figure 8 is a side view of the sliding plug valve of Figures 6 and 7.

Figure 9 is a cross-sectional view thereof taken on the line 9—9 of Figure 8, and Figure 10 is a fragmentary, side elevation of the manually operable mechanism for actuating the valve.

Figure 1:
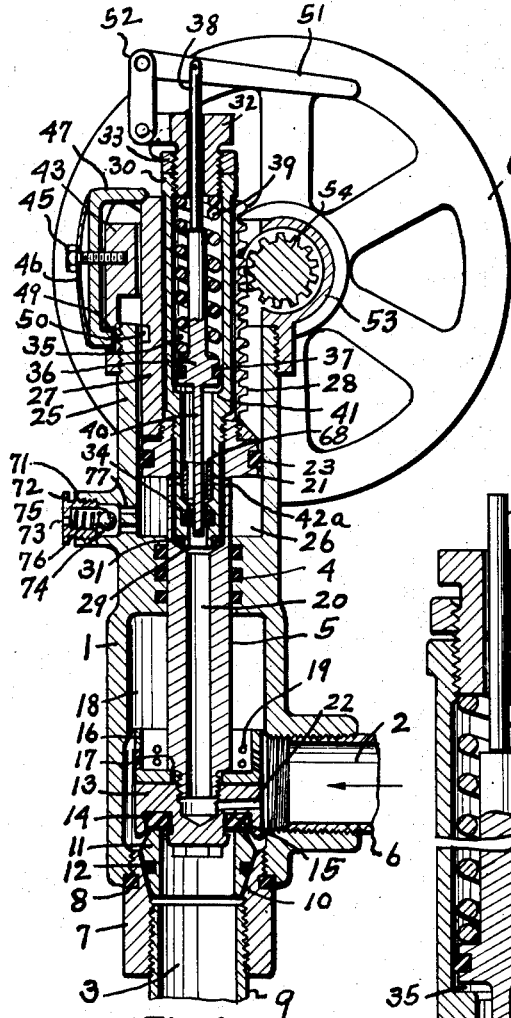
Figure 1 is a vertical, sectional view of one embodiment of the invention showing the valve closed.

Referring now more particularly to the drawings, wherein like numerals of reference designate the same parts in each of the figures, the numeral 1 designates an approximately T-shaped housing having an inlet 2 and an outlet 3 at right angles to the inlet. Opposite the outlet there is a stuffing box packing assembly 4 through which a tubular valve stem 5 is slidable.

An inlet pipe 6 is connected into the inlet 2.

There is a tubular nipple 7 whose inner end is reduced and threaded into the outlet 3 and sealed with the corresponding end of the housing by means of a seal ring 8 clamped between the nipple and housing end.

The outer end of the nipple is internally threaded to receive the externally threaded end of an outlet pipe 9.

The nipple is formed with an inwardly facing flared face 10 to receive a removable annular valve seat 11 whose inner end face is spaced inwardly beyond the corresponding end of the nipple 7. This valve seat has an external annular seal ring 12 countersunk therein which forms a seal with the face 10.

Screwed onto the inner end of the stem 5 there is a valve body 13 whose end, facing the seat 11, is formed with a relatively deep annular groove 14 in which a resilient seal ring 15 is located and which rests on the seat to form a fluid tight seal when the valve is in closed position, said body 13 and seal ring 15 forming the main valve.

There is a cup ring 16 around the stem 5 and which is clamped thereon between the valve body 13 and an external annular shoulder 17 on said stem 5. This cup ring works closely within the valve chamber 18 in the housing 1 and is formed with a selected number of perforations 19 to gradually permit escape of liquid entrapped in the chamber 18 as the valve moves toward open position.

As hereinabove stated the stem 5 is tubular having an axial passageway 20 therethrough and this passageway communicates with the inlet 2 by means of a radial duct 22 in the valve body 13.

Formed integrally with the stem 5 and located in the opposite side of the stuffing box 4 from the housing 1 there is a piston 21 countersunk into which, circumferentially, there is an annular seal ring 23.

Formed integrally with the housing 1 there is a cylinder 25 in which the piston 21 works thus providing a pressure chamber 26 between the piston 21 and the closed end of the cylinder 25.

Slidably mounted within the cylinder 25 and threaded onto the adjacent end of the stem 5 there is a sleeve 27 having an external rack face 28.

The end of the stem 5 on which the piston 21 is formed, is enlarged internally forming an inside tapering seat 29 and screwed into said end there is a tubular spring housing 30. One end of said housing is reduced in diameter and extends into the adjacent end of the stem 5 and is provided with an external seal ring 31 which forms a seal with the seat 29. The other end of said spring housing 30 extends beyond the end of the stem 5 and screwed into the outer, or free end, of said spring housing there is a gland 32 which is locked in position by means of a lock nut 33 screwed thereon and abutting the adjacent end of the spring housing.

As hereinabove stated the spring housing 30 is tubular having an axial passageway entirely therethrough whose inner end is reduced in internal diameter and is provided with an annular seal ring 34 countersunk into the inside wall thereof. The outer end of the passageway through the spring housing is internally enlarged forming a cylindrical chamber 35 in which a piston 36 is slidably mounted. Around said piston and countersunk therein there is a seal ring 37 which forms a seal with the walls of the cylindrical chamber 35. This piston has an outwardly extended stem 38 which works through the gland 32 and surrounding said stem and located within the cylinder 35 there is a coil spring 39 one end of which bears against the inner end of the gland 32 and whose other end bears against the piston 36.

A control valve in the form of a finger valve 40 extends inwardly from the piston 36 and works closely through the seal ring 34 to form a closure.

The spring housing has an inside, annular outwardly facing shoulder 41 which limits the inward movement of the piston 36 and control valve 40.

The stem 5 and spring housing 30 are provided with registering ports, indicated generally by the numerals 42, 42a through which the passageway through said spring housing communicates with the chamber 26.

Normally the seal ring 15 will be seated on the seat 11 and the normal pressure in the inlet pipe 6 will be transmitted through the duct 22 and passageway 20 and the inner end of the finger valve 40 will be exposed to said pressure. Upon an increase of pressure beyond the desired limit the finger valve 40 will be moved outwardly thus clearing the seal ring 34 and allowing the pressure fluid to pass through the ports 42, 42a into the chamber 26 and operate against the enlarged area of the piston 21. The amount of pressure required to open the finger valve 40 may be regulated, through the gland 32, by regulating the compression to the spring 39.

Upon entry of the high pressure liquid into the chamber 26 and against the enlarged area of said piston 21 the piston 21 will be moved outwardly thus moving the valve assembly which closes seat 11 outwardly opening the outlet 3 to permit the escape of the liquid pressure built up.

Screwed on to the outer end of the cylinder 25 there is a coupling 43. Mounted on one side of the coupling 43 there is a latch 44 whose ends are inwardly turned. This latch is loosely mounted on a retaining bolt 45 which passes through the latch and is screwed into the coupling 43. There is an outwardly bowed spring 46 through which the bolt 43 also passes and against which the bolt head rests so as to hold the ends of the spring 46 yieldingly against the corresponding ends of the latch.

One inwardly turned end 47 of the latch engages the upper end of the sleeve 27, and thus assists in holding the valve assembly down with the seal ring 15 firmly seated on the seat 11. The contacting parts of said latch and sleeve are tapered so that said inwardly turned end will automatically release the sleeve when the pressure exceeds a predetermined limit and elevates the sleeve as hereinabove explained.

The other inwardly turned end 48 of the latch works in an external recess 49 in the lower end of the coupling 43 as indicated in Figure 1 so as to allow the latch the required range of movement.

Upon an increase of pressure above the predetermined limit the entire assembly connected to the stem 5 will move upwardly. The sleeve 27 is provided with an external notch, or recess, 50 positioned to align with the inwardly turned end 47 of the latch when said assembly reaches the limit of its upward movement and said end will drop into said recess 50 to assist in retaining the assembly in its upper position. It will be noted from an inspection of Figure 1 that the inwardly turned end 47 is also beveled downwardly. The assembly may be manually lowered, as hereinafter explained and upon downward movement of the assembly the beveled end 47 will be released from the recess 50 and the assembly may then be moved on down to original position, as shown in Figure 1.

There is a release lever 51 which is pivotally connected, at one end, to the link 52. These links in turn are pivotally connected to the gland 32. The upper end of the stem 38 is pivotally connected to the release lever 51. Provision is thus made for manually elevating, or opening, the valve 40 to allow the pressure liquid in the inlet pipe 6 to reach the underside of the piston 21 to elevate the entire valve assembly as a unit.

Formed integrally with the coupling 43 there is a transverse gear case 53 wherein a spur gear 54 is mounted to rotate, said gear being in mesh with the rack face 28, as shown in Figure 1. This gear has the end pintles 55, 56 preferably formed integrally therewith and which are mounted to rotate in the end bushings 57, 58 which are removably retained in place in the case 53 by suitable set screws 59, 60 which are screwed through the gear case 53.

Loosely mounted on the outer end of the pintle 56 there is a hand wheel 61 which is retained against detachment by means of a washer 62 and a retaining screw 63, the latter of which is screwed into the outer end of the pintle 56.

Between the hub of the hand wheel 61 and the corresponding end of the case 53 there is a collar 64 which is keyed, or pinned, to the pintle 56 by means of the pin 65 which passes through said collar and pintle.

On the adjacent ends of said hub and collar there are the lugs 66 and 67, respectively, which are arranged to interengage upon turning movement of the hand wheel 61. Should it be desired to open the valve the hand wheel 61 may be turned in an appropriate direction and the lug 66 thereof will eventually come into contact with the lug 67 of the sleeve 64 and upon further turning movement the gear 54 will be turned and by reason of its intermeshing relationship with the rack face 28 will lift and open the valve assembly as a unit. Should said assembly be stuck the hand wheel 61 may be turned in a reverse direction and then again turned forwardly causing the lug 66 to strike the lug 67 with a jarring effect to thus gradually release the valve assembly whereupon it may be elevated by the further turning movement of the hand wheel 61. Normally the hand wheel will be in position so that the lug 66 will be spaced from the lug 67 a sufficient distance so that when the valve assembly is automatically elevated by excess pressure the rotation of the sleeve 64 will not be of sufficient range to carry said lug 67 into contact with the lug 66 so that the hand wheel 61 will not be rotated when the valve assembly is automatically open by excess pressure. The normal position of the lug 66 is shown, in dotted lines, in Figure 5.

Figures 3, 4, 5:
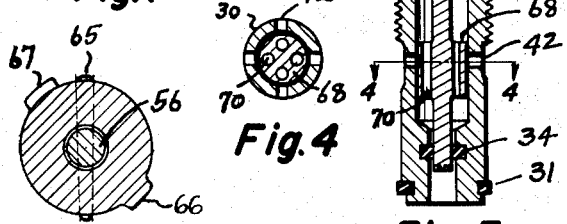
Figure 3 is an enlarged, vertical, sectional view of a pilot valve assembly.
Figure 4 is a cross-sectional view taken on the line 4—4 of Figure 3.
Figure 5 is a cross-sectional view taken on the line 5—5 of Figure 10.

The pilot or control valve assembly is shown in better detail in Figure 3. On the finger valve 40 there is a cylindrical slide valve 68 which normally closes the side ports 42, hereinbefore referred to. This slide valve has the longitudinal liquid passageways 70 therethrough. When the pressure is sufficient to open the valve 40 the pressure liquid will freely pass through the passageways 70 and on into the pressure chamber 35 beneath piston 36 and the pressure will be equalized on opposite sides of the slide valve 68 and upon further movement of the valve 40 the radial ports 42 will be cleared by it and fully opened thus allowing the pressure liquid to more quickly enter the pressure chamber 26. However, the ports 42 are not cleared by the slide valve until the valve 40 is fully open and the pressure has become equalized on opposite sides of said slide valve so that when the ports 42 are fully open the velocity of the liquid through the seal ring 34 will be somewhat retarded thereby eliminating excessive erosion on said ring.

The parts 30 to 42, inclusive, and 68, 70 constitute the pilot valve, or controlling valve, assembly.

Formed on the side of the cylinder 25 there is a laterally extended valve housing 71 into the outer end of which a gland 72 is screwed, said gland having a leak port 73. This gland and housing encloses a valve chamber 74 in which there is located a ball valve 75 which is normally held in its inner, or open, position by means of a coil spring 76. Valve chamber 74 is connected with the pressure chamber 26 by means of the passageways 77 which are normally open. When the valve assembly is opened manually the liquid may slowly leak out through the passageways 77 and the port 73 to relieve the liquid from the chamber 26, but when the pressure becomes high enough to open the valve assembly automatically the velocity of the liquid will operate against the valve 71 to close it thereby sealing against further passage of liquid through the port 73.

Referring now to Figures 6 to 9, inclusive, the numeral 1a designates a valve housing having an inlet 2a and an outlet 3a, which are substantially transversely aligned. An inlet pipe 6a is connected into the inlet 2a and an outlet pipe 9a is connected into the outlet 3a.

Slidably mounted in the housing 1a there is a cylindrical shaped slide valve 78 which is provided with a transverse flowway 79 and which is movable to bring said flowway into and out of registration with the inlet and outlet 2a and 3a. This valve is fixed to the end of the stem 5a which works through the stuffing box 4.

The end of the housing 1a opposite the stuffing box 4 has a suitable plug 80 screwed therein which is provided with suitable inside sealrings, as 81, and a guide stem 82, of approximately the same diameter as the stem 5a is connected to the valve 78 and works through said plug 80 with the seal rings 81 forming a fluid tight seal around said guide stem.

The stem 5a is tubular having the axial passageway 20a therethrough, as indicated in Figure 6 and this passageway continues on through the valve 78 and is laterally turned and communicates with the inlet 2a when the valve is closed.

The valve 78 has the external end sealrings 83, 84 countersunk therein at the ends of the valve, as shown in Figures 6 and 7 and these seal rings 83, 84 are connected by oppositely disposed sealing strips 85, 85 which are countersunk into the valve substantially midway between the ends of the flowway 79, as best illustrated in Figure 9, and, with the seal rings 83, 84 seal off the inlet 2a from the outlet 3a.

The valve 78 also has one of more longitudinal passageways 86 whereby the pressure will be equalized on opposite sides of said valve.

Figure 2:
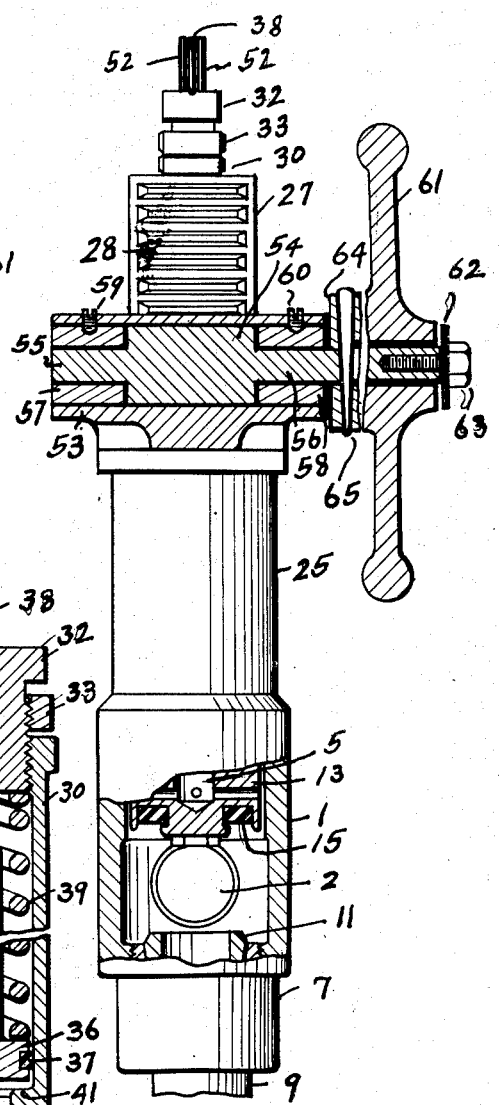
Figure 2 is a side elevation, partly in section, taken at right angles to the view shown in Figure 1 showing the valve in open position.

Instead of the hand wheel 61, shown in Figures 1 and 2, a manually operable hand lever 61a may be mounted on the pintle 56 and which is operable in the same manner and for the same purpose as the hand wheel 61.

In other respects the type of construction shown in Figures 6 to 9 is the same as that shown in Figures 1 to 5, inclusive.

What I claim is:

1. A relief valve assembly comprising, a valve housing having an inlet and an outlet, a relief valve in the housing movable to one position to close the outlet and to another position to open the outlet, valve actuating means, said assembly having a conduit leading through the relief valve and provided with an opening through which said actuating means may be exposed to the pressure of the fluid entering said inlet, a control valve normally closing said conduit but movable, upon an increase of said pressure, to open the conduit and means normally closing said opening and operable subsequent to the opening of the control valve to admit said pressure fluid to said actuating means.

2. A relief valve assembly comprising, a valve housing having an inlet and an outlet, a relief valve in the housing movable to one position to close the outlet and to another position to open the outlet, valve actuating means, said assembly having a conduit provided with an opening through which the actuating means may be exposed to the pressure of the fluid entering said inlet, a control valve normally closing said conduit but movable, upon an increase of said pressure, to open the conduit, valve means normally closing said opening and operable with said control valve to admit fluid from the conduit to the valve actuating means subsequent to the opening of the control valve, a yieldable element maintaining the control valve in closed position, and means for varying the influence of the yieldable means on said control valve.

3. A relief valve assembly comprising, a valve housing having an inlet and an outlet, a relief valve in the housing movable to one position to close the outlet and to another position to open the outlet, valve actuating means, said assembly having a conduit leading through the valve and provided with an opening through which said actuating means may be exposed to the pressure of the fluid entering said inlet, a control valve normally closing said conduit but movable, upon an increase of said pressure, to open the conduit and means normally closing said opening and movable with the control valve subsequent to an opening movement of the control valve to allow said fluid pressure to move the actuating means to open said relief valve.

4. A relief valve assembly comprising, a valve housing having an inlet and an outlet, a relief valve in the housing movable to one position to close the outlet and to another position to open the outlet, valve actuating means including a cylinder and piston connected to the valve, said assembly having a conduit provided with an opening through which the actuating means may be exposed to the pressure of the fluid entering said inlet, a control valve normally closing said conduit but movable, upon an increase of said pressure, to open the conduit and means normally closing said opening and movable with the control valve when the control valve is open to allow the fluid under pressure to operate against the actuating means to open the relief valve and manually operable means for closing the relief valve.

5. A relief valve assembly comprising, a valve housing having an inlet and an outlet, a relief valve in the housing movable to one position to close the outlet and to another position to open the outlet, valve actuating means, said assembly having a conduit provided with an opening through which said actuating means may be exposed to the pressure of the fluid entering said inlet, a control valve normally closing the conduit, means carried by the control valve normally closing said opening and movable subsequent to the opening of the control valve to admit fluid from the conduit to said actuating means and manually operable means for moving said relief valve, valve actuating means and control valve as a unit to move the relief valve to open position.

6. A relief valve assembly comprising, a valve housing having an inlet and an outlet, a relief valve in the housing movable to one position to close the outlet and to another position to open the outlet, valve actuating means, said assembly having a conduit provided with an opening through which the actuating means may be exposed to the pressure of the fluid at the inlet, a control valve normally closing said conduit but movable, upon an increase of said pressure, to open the conduit and means normally closing said opening and arranged to retard the flow of pressure fluid through the conduit as the control valve is opened, said means being movable to admit fluid from the conduit to said actuating means when the control valve is open.

7. A relief valve assembly comprising, a valve housing having an inlet and an outlet, a relief valve in the housing movable to one position to close the outlet and to another position to open the outlet, valve actuating means, said assembly having a conduit provided with an opening through which said actuating means may be exposed to the pressure of the fluid entering said inlet, a control valve normally closing the conduit, valve means normally closing said opening and operable with said control valve to admit fluid from the conduit to said actuating means after an opening movement of the control valve, manually operable means for moving said relief valve, valve actuating means and control valve as a unit to move the relief valve to open position, and retaining means on the assembly releasably engageable with said unit and effective to retain the relief valve in open or closed position.

8. A relief valve assembly comprising, a valve housing having an inlet and an outlet, a relief valve in the housing movable to one position to close the outlet and to another position to open the outlet, said assembly having a pressure chamber and a conduit provided with an opening through which pressure fluid from the inlet may enter said chamber, valve actuating means exposed to the pressure of the fluid in said chamber, a control valve normally closing the conduit and mounted to be opened upon an increase of the pressure of the fluid, means normally closing the opening and movable when the control valve is opened to admit pressure fluid into the chamber to actuate said valve actuating means and an automatically operable valve controlled drain outlet leading from said chamber.

9. A relief valve assembly comprising, a valve housing having an inlet and an outlet, a relief valve in the housing movable to one position to close the outlet and to another position to open the outlet, valve actuating means, said assembly having a conduit provided with an opening through which said actuating means may be exposed to the pressure of fluid from said inlet, a control valve normally closing the conduit and mounted to move as a unit with the relief valve, means normally closing said opening and operable when said control valve is opened to admit fluid from said conduit to said actuating means, manually operable means geared to said unit through which the unit may be moved to move the relief valve to open or closed position.

LUTHER E. BROWN.

References Cited in the file of this patent

UNITED STATES PATENTS

| Number | Name | Date |
|---|---|---|
| 382,643 | Fox | May 8, 1888 |
| 591,013 | Schreidt | Oct. 5, 1897 |
| 635,149 | Schreidt | Oct. 17, 1899 |
| 1,032,352 | House | July 9, 1912 |
| 1,229,726 | Ebeling | June 12, 1917 |
| 1,960,831 | Shand | May 29, 1934 |
| 2,165,611 | Campbell | July 11, 1939 |
| 2,249,206 | Hubbard | July 15, 1941 |
| 2,256,365 | Wentworth | Sept. 16, 1941 |